United States Patent [19]

Helmboldt et al.

[11] Patent Number: 5,660,625

[45] Date of Patent: Aug. 26, 1997

[54] USE OF BASIC ALUMINIUM SULPHATES AS LOW-ALKALI SET ACCELERATORS FOR CEMENT

[75] Inventors: Otto Helmboldt, Ludwigshafen; Istvan Potencsik, Mannheim; Johannes Breker, Ludwigshafen; Reinhold Sedelies, Schifferstadt; Detlev Roggenkamp, Ludwigshafen, all of Germany

[73] Assignee: Giulini Chemie GmbH, Germany

[21] Appl. No.: 586,688

[22] PCT Filed: Jul. 5, 1994

[86] PCT No.: PCT/EP94/02190

§ 371 Date: Jan. 24, 1996

§ 102(e) Date: Jan. 24, 1996

[87] PCT Pub. No.: WO95/03257

PCT Pub. Date: Feb. 2, 1995

[30] Foreign Application Priority Data

Jul. 24, 1993 [DE] Germany ............ 43 24 959.0

[51] Int. Cl.$^6$ .................................. C04B 22/14
[52] U.S. Cl. ............. 106/736; 106/819; 423/556
[58] Field of Search .................... 106/736, 819; 423/556

[56] References Cited

U.S. PATENT DOCUMENTS

| 3,114,647 | 12/1963 | Mecham | 106/736 |
| 4,415,367 | 11/1983 | Nelson | 106/736 |

FOREIGN PATENT DOCUMENTS

| 2571142 | 11/1988 | Czechoslovakia . | |
| 0076927 | 4/1983 | European Pat. Off. . | |
| 0026262 | 3/1984 | European Pat. Off. . | |
| 0110847 | 6/1984 | European Pat. Off. . | |
| 0321445 | 6/1989 | European Pat. Off. . | |
| 2031950 | 11/1970 | France . | |
| 2018129 | 10/1970 | Germany . | |
| 2122710 | 11/1971 | Germany . | |
| 672171 | 7/1979 | U.S.S.R. | 106/736 |
| 823336 | 4/1981 | U.S.S.R. | 106/736 |
| 1046268 | 10/1983 | U.S.S.R. | 106/736 |
| 1090848 | 5/1984 | U.S.S.R. | 106/736 |

OTHER PUBLICATIONS

Chemical Abstracts, vol. 90, No. 26, Jun. 25, 1979, Columbus, Ohio, U.S.; abstract No. 206693v, Y. Fjihira et al "Transparent aqueous aluminum sulphate from alumina sludge", p. 162; JPA781462997 (Nippon Light Metal Co., Ltd.) Dec. 20, 1978.

Chemical Abstracts, vol. 111, No. 6, Sep. 18, 1989, Columbus, Ohio, U.S., abstract No. 102002e, S. Slanicka "Rapid-setting cement mixtures", p. 302; & CSA257,142 (S. Slanicka et al) Nov. 15, 1988.

Chemical Abstracts, vol. 96, No. 20, Nov. 25, 1981, Columbus, Ohio, U.S., abstract No. 167570e, K. Nakanishi "Setting Acceleration of Cement", & JP 56-049867, Nov. 25, 1981.

*Primary Examiner*—Anthony Green
*Attorney, Agent, or Firm*—Spencer & Frank

[57] ABSTRACT

Improved set accelerating mixtures and their use are disclosed to shorten the period after mixing hydraulically setting building materials, for example cement, up to the transition into the solid phase. The improved set accelerating mixtures comprise basic aluminum sulphates of the formula: $Al(OH)_a(SO_4)_b$, in which the subscripts satisfy the conditions:

$a=3-2b$ and $b=0.05$ to $0.4$.

These basic aluminum sulphates are produced by parallel precipitation from solutions containing aluminum at temperatures usually less than 60° C. by mixing dilute acid solutions and alkaline solutions containing sulphates in the pH range from 5.0 to 8.0 to produce an amorphous, basic aluminum sulphate.

7 Claims, No Drawings

USE OF BASIC ALUMINIUM SULPHATES AS LOW-ALKALI SET ACCELERATORS FOR CEMENT

FIELD OF THE INVENTION

The present invention concerns the use of basic aluminium sulphates of the general formula $Al(OH)_a(SO_4)_b$, whereby the indices a and b fulfil the following conditions:

$$a=3-2b \text{ and } b=0.05-0.4$$

as set accelerating admixture for hydraulically setting building materials, in particular for cement.

TECHNOLOGY REVIEW

Cement is an essential constituent of concrete. Since most concreting work in the alpine countries, e.g. in tunnel construction, occur in the months with low temperatures, it is necessary to influence the setting, processing and hardening time by admixtures. These admixtures are used primarily to solve the following problems:

1. if formwork should be removed earlier
2. if concrete should be protected against frost with cold outdoors temperatures
3. if the setting time of concrete should be shortened
4. if the concrete aftertreatment time should be reduced
5. and if a fast setting gunite should be produced.

Especially for the production of fast setting gunite, no other alternative is available than using set accelerating admixtures.

A number of set accelerating admixtures are known in the current state of technology.

The admixtures are classified according to their function and there are also overlapping effects:

1. Set accelerating admixtures

These are such admixtures which shorten the period after mixing the concrete up to the transition into the solidified phase.

2. Hardening accelerating admixtures

These are such admixtures which accelerate the development of the early strength of concrete with or without influence on the setting time.

In the course of the present invention, compounds are presented here which preferably influence the processes named in Item 1, i.e. these are compounds which considerably shorten the period after mixing of the concrete up to the transition into the solidified phase. They are also named in the following briefly only as set accelerators (SA).

The following are known in the current state of technology as set accelerators:

Calcium chloride, sodium silicate, sodium hydrogen carbonate, sodium bicarbonate, sodium aluminate, aluminium sulphate, calcium formate, triethanolamine (TEA), soluble alkali fluorides and Seignette salt.

Aluminium hydroxides, which are used either alone or mixed with other compounds, are also known as SA.

Thus the use of aluminium hydroxide is described, for instance in the CA96:167570e and in the EP-0 026 262 B1.

An alkali-free and chloride-free set accelerator, which is characterized in that it contains amorphous aluminium hydroxide mixed with at least one water-soluble sulphate and/or nitrate and/or formate is described in the EP-0 076 927 B1. The set accelerating effect on cement is increased by mixing the amorphous aluminium hydroxide with water-soluble sulphates, nitrates and formates of the alkaline earth and transition metals. However, the disadvantage of this method is seen in that it contains water-soluble added substances of which it is known that they negatively influence the setting process of the cement.

Using aluminium sulphate alone or as mixing component for accelerated setting of cement is also known from the FR-2031950.

A cement mixture is known from the CS-257142 which, apart from cement, water and/or filler and/or admixture substances possibly contains calcined aluminium sulphate, here designated as additional substance C, column 6, 1st paragraph of the German translation. The additional substance C is obtained here by calcination at 600° C. for 5 hours. It was determined by means of RTG phase analysis that this substance C is neither $Al_2O_3$ nor $Al(OH)_3$. The additional substance C has a molar ratio of $Al_2O_3$: $SO_3$ of 1:2.367, i.e. S/AL=1.184.

A disadvantage of this method is the fact that to obtain this product, calcination must be very long at high temperatures, which is unfavourable with regard to energy consumption. In addition a product which is inhomogeneous and does not deliver reproducible results in its effect as SA is produced by the calcination.

Using a calcined aluminium sulphate as set accelerator component is also already known from the DE-OS 21 22 710, in which case here as well it is already clear that calcination must last a very long time, namely 24 h at 450°–490° C. in order to obtain a suitable type of aluminum sulphate.

As already discussed above, SA known in the current state of technology frequently have disadvantages limiting their use. In the case of alkaline SA, e.g. water glass or sodium aluminate, both of which are also used in the wet spraying method, there is the disadvantage that a relatively high degree of occupational safety protection is required. Residues of the named substances from the machines on the site can permeate the surroundings without selective neutralization, which primarily results in impairment of the environment. Additional substances, such as sodium silicate, are indeed effective set accelerators, but result in poor final strength of the concrete. Calcium chloride or SA containing chlorides result in high corrosiveness in concrete parts and are therefore not suitable.

There was therefore a need for SA which do not have the above named disadvantages, are low in alkali, accelerate setting and simultaneously do not worsen the compression strength of the concrete.

SUMMARY OF THE INVENTION

The task could be solved surprisingly by the use of basic aluminium sulphates with the general formula $Al(OH)_a(SO_4)_b$, in which case the indices fulfil the conditions $$b=0.05-0.4 \text{ and } a=3-2b.$$

Parallel precipitation from solutions containing aluminium at a temperature preferably less than 60° C. has proven itself for the manufacture of the basic aluminium sulphates in accordance with the invention. Although the precipitation is apparently simple, complying with the sequence of the addition of the components, the temperature and the pH value are of importance, for only in this way is it guaranteed that a suitable type in accordance with the invention is formed.

DETAILED DESCRIPTION OF THE INVENTION

Parallel precipitation can be performed with technical sodium aluminate solutions and an acidic component.

However, it is also possible to start off with an acidic component containing aluminium, e.g. aluminum sulphate. It is essential in the process according to the invention that the required Al content of the product of precipitation can be introduced both by the acid and by the alkaline component.

The use of residual substance solutions, e.g. from the anodizing process, is also possible. If such a solution is used as a component, then the product of precipitation obtained from it can contain some carbonate.

Compliance with the precipitation conditions is an essential characteristic of the present invention. It is true that there is always a product of precipitation, of which one could assume that it constantly has the same composition according to precipitation condition. However, not every product of precipitation represents an amorphous basic aluminium sulphate according to the invention suitable for accelerating cement setting.

It has therefore been proven necessary to develop a test method according to which the suitable types can be found. A criterion for the especially advantageous basic aluminium sulphates within the meaning of the invention is their behaviour in the pH range measurable for the cement-water paste, at around 13.

The test makes it possible to differentiate between material precipitated according to the invention (example 1) and other basic aluminium sulphates and hydroxides with clearly less set accelerating effect.

The compounds suitable according to the invention show a characteristic solubility in alkali hydroxide solutions, which at the prescribed concentrations (OH content of the solution, $Al_2O_3$ content achieved by addition of the components) leads to a more or less fast reduction of the pH value.

For example, the test can be performed in the following form:

The quantity of the component corresponding to 0.5 g $Al_2O_3$ is weighed into a 150 ml beaker. This is filled up to 50 g with distilled water. The mixture is homogenized with an Ultra Turrax IKA T50 (1 min at 3000 rpm; tool G45F). The paste remaining in the homogenizer is washed back into the beaker with a total of 49 g distilled water. The pH value of the suspension obtained in this way is measured with a glass electrode after stirring for 4 min. Subsequently 1 ml of an approx. 10M NaOH is pipetted into the stirred suspension and the pH value is measured anew 1 min after the addition of alkali. A third pH measurement is made 60 min after the alkali addition. The 1st pH measurement shows that the substances according to the invention are compounds with no or little alkaline reaction. The pH value is less than 9, preferably 4.5–8.0.

The 2nd and 3rd pH measurement delivers the decision criterion between compounds that are suitable or less well suited according to the invention. Compounds in which the pH value of the suspension has dropped before the 2nd measurement quickly to at least a value of 11.8 (preferred 11.1–11.4) are therefore well suited. The difference between the 2nd and 3rd measurement should not exceed 0.2 pH units.

In the case of unsuitable compounds, the starting pH value (approx. 13.0 for 1 ml 10M NaOH in 100 ml water) drops only slowly and is still above 12.0 after 1 min. The 3rd measurement shows that calcined aluminium sulphates, for instance, behave completely differently than the compounds according to the invention.

It is particularly important that the amorphous basic aluminium sulphate according to the invention can be used as SA both in the form of a dried and ground solid and in the form of a suspension mashed with water. The filter cake may be homogenized with further auxiliary products and used as a suspension.

For example, the amorphous basic aluminum sulphate can be used in the form of a homogenized suspension containing 0.5% by weight of $Al_2O_3$ in distilled water. This homogenized suspension exhibits a pH value of less than 11.8 within 60 seconds after the addition of 0.4% NaOH (weight percent compared to the suspension).

EXAMPLES

One can proceed according to the following method for the manufacture of the compounds according to the invention, whereby this method does not limit the invention.

Example 1

2 l water are filled into a 5 l beaker. A diluted $H_2SO_4$ (8.71% by weight $SO_4$) and a diluted sodium aluminate solution (5.5% $Na_2O$, 4.0% $Al_2O_3$) are dosed within 1 h simultaneously at RT under agitation so that the pH value remained in the range from 6.5–7.5. After a further stirring time of 40 min, the suspension is filtered off through a pressure filter and subsequently washed out with $H_2O$. Related to the dry substance, the product contains 53.0% $Al_2O_3$ and 13.4% $SO_4$, the molar ratio of S/Al was 0.134. A part of the filter cake was resuspended with water under addition of a known fluidizer, e.g. naphthalene formaldehyde condensate sulphonate Ca salt, to form a thixotropic, low-viscosity liquid. Another part of the filter cake was dried off in a circulating air cabinet at 120° C. down to a residual moisture of approx. 14%.

The following 2 examples contain materials according to the invention which had been manufactured from residual substance solutions from the anodizing process.

Example 2

A pressed filter cake which was obtained by neutralization precipitation in accordance with example 1, was dried in a shelf drier to a residual moisture content of 11%.

Example 3

A pressed filter cake which was obtained by neutralization precipitation in accordance with example 1, was mashed to a suspension containing approx. 10% solids. The suspension was processed on a spray drier (inlet temperature 280° C., outlet temperature 80° C.) to form an easily flowing powder with a residual moisture content of 10.5%.

Example 4a (comparative example)

1.8 kg of a diluted sodium aluminate solution (4.0% $Al_2O_3$, 5.5% $Na_2O$) were filled in a 5 l beaker. Under intensive agitation, a diluted sulphuric acid (4.26% $SO_4$, 0.45% $Al_2O_3$) was dosed at room temperature until the pH value had dropped to 7.0. After a further agitation time of 1 h, the suspension was filtered off and the filter cake was washed out with water. Related to dry substance, the product contains 60.9% $Al_2O_3$, 8.4% $SO_4$ and had a molar ratio S/Al of 0.073.

Example 4b (comparative example)

0.8 kg of a diluted sodium aluminate solution (9.0% $Al_2O_3$, 13.95% $Na_2O$) were filled in a beaker. Under intensive agitation, a diluted sulphuric acid (8.88% $SO_4$, 1.0% $Al_2O_3$) was dosed at 55°–60° C. until the pH value had dropped to 7.0. After a further agitation time of 1 h, the suspension was filtered off and the filter cake was washed out with water. Related to dry substance, the product contains 68% $Al_2O_3$, 1.49% $SO_4$ and had a molar ratio S/Al of 0.012.

Example 5

Approx. 1.6 kg caustic soda solution (density 1.078 g/ml) were filled into a 10 l beaker. A diluted aluminium sulphate solution (density 1.051 g/ml) was dosed to this at room temperature under intensive agitation within 60 min until the pH value had dropped to 8.6. After a further agitation time of 4 h, the suspension was filtered off and washed with water. The filter cake contained 4.8% $Al_2O_3$, 0.27% $SO_4$, it had a molar ratio of S/Al of 0.03.

Example 6

Solid aluminium sulphate with a molar ratio of S/Al of 1.47 was calcined for 4 h at 800° C. in the muffle furnace. An analysis of the product resulted in the following composition: w(Al)=18.2%; w($SO_4$)=77.5%. The molar ratio of S/Al is computed from this at 1.2.

TABLE 1

Reaction to pH value change

| Substance | MR($SO_4$/Al) | before NaOH addition Starting value | after NaOH addition 1 min | after NaOH addition 60 min |
|---|---|---|---|---|
| Suspension from example 1 | 0.134 | 6.5 | 11.0 | 11.1 |
| Powder from example 2 | 0.12 | 6.9 | 11.4 | 11.3 |
| Powder from example 3 | 0.16 | 7.0 | 11.7 | 11.5 |
| Suspension from example 4a | 0.073 | 6.6 | 12.3 | 12.1 |
| Suspension from example 4b | 0.012 | 7.1 | 12.7 | 12.7 |
| Suspension from example 5 | 0.03 | 7.1 | 13.0 | 12.8 |
| Powder from example 6 | 1.2 | 4.6 | 13.0 | 5.2 |

The suitability of these compounds as set accelerating admixtures in cement was tested according to a method analogous to the DIN 1164 Part 5 regulation.

In each case 290 g of the cement type PZ 35 F (Heidelberger Zementwerke) were used. The water/cement ratio was uniformly at 0.41.

The quantity of set accelerator in accordance with the present invention was agitated briefly with the mashing water, whereby the moisture content was taken into account as water.

The cement flour was now added to this mixture and homogenized for 30 seconds with a hand-held stirrer (600 rpm) and introduced immediately in the hard rubber ring (Vicat ring).

The following Table shows the required test weight of accelerator (with regard to dry substance) which is necessary to accelerate the start of setting to 2.3 to 0.25 min as from start of mixing.

TABLE 2

Comparison of the set accelerating effect

| Substance with regard to Portland cement | MR($SO_4$/Al) | required test weight (% by weight) for setting start of 2.3 + 0.25 min |
|---|---|---|
| Filter cake from example 1 | 0.134 | 0.76 |
| Product from example 2 | 0.12 | 0.83 |
| Product from example 3 | 0.27 | 0.70 |
| Product from example 4a | 0.073 | 1.02 |
| Product from example 4b | 0.012 | has no accelerating effect |
| Product from example 5 | 0.03 | has no accelerating effect |
| Mixture according to EP 0 076 927 B1[1]) | 0.11 | 1.49 |
| Mixture according to EP 0 076 927 B1[1]) | 0.25 | 1.72 |

[1]) The mixture was produced according to the EP 0 076 927 B1 from amorphous Al(OH)$_3$ and $Al_2(SO_4)_3$. The quantity portions were selected so that the molar ratios $SO_4$/Al of 0.11 and 0.25 were obtained.

The strength test was performed according to DIN 1164 Part 7.

TABLE 3

Influence of the compound according to the invention on the development of strength

| Accelerator Type | Test weight % by weight dry substance with regard to cement | Compression strength in [kp/cm²] after | | |
|---|---|---|---|---|
| | | 1 day | 3 days | 28 days |
| without | — | 209 | 339 | 497 |
| according to EP 0 026 262 B1 | 0.33 | 184 | 330 | 511 |
| | 0.82 | 129 | 321 | 503 |
| according to example 3 | 0.39 | 214 | 297 | 476 |
| | 0.78 | 177 | 286 | 521 |

What is claimed is:

1. In a process for the accelerated setting and hardening of a hydraulic bonding agent selected from cement, mortar, or concrete, the improvement comprising a set accelerating agent consisting essentially of a homogenized suspension of an amorphous basic aluminum sulphate having the formula:

$$Al(OH)_a(SO_4)_b$$

the indices a and b fulfilling the condition

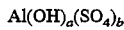

$a=3-2b$ and $b=0.05-0.4$, wherein said homogenized suspension contains 0.5% by weight $Al_2O_3$ in distilled water and exhibits after the addition of 0.4% NaOH (with regard to the suspension) a pH value which drops to less than 11.8 within 60 minutes.

2. The process according to claim 1, wherein the amorphous basic aluminum sulphate additionally contains $CO_3^{2-}$.

3. The process according to claim 1, wherein the amorphous, basic aluminium sulphate is obtained by mixing acid solutions and alkaline solutions containing sulphates in the pH range from 5.0–8.0, and precipitation of the aluminium sulphate at temperatures below 60° C., and Al is introduced by the acid solutions, alkaline solutions or mixtures thereof.

4. The process according to claim 1, wherein the homogenized suspension contains <6% $Al_2O_3$.

5. The process according to claim 1, wherein the homogenized amorphous, basic aluminium sulphate is separated by filtration producing a filter cake, and washed.

6. The process according to claim 5, wherein the filter cake is homogenized with further auxiliary products mixed with water to form a homogenized suspension.

7. The process according to claim 5, wherein the filter cake is dried with a drier to a residual moisture content <25%.

* * * * *